(12) United States Patent
Tan et al.

(10) Patent No.: US 8,619,178 B2
(45) Date of Patent: *Dec. 31, 2013

(54) IMAGE RENDITION AND CAPTURE

(75) Inventors: Kar Han Tan, Sunnyvale, CA (US);
Daniel George Gelb, Redwood City, CA
(US); Ian N Robinson, Pebble Beach,
CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 837 days.

This patent is subject to a terminal disclaimer.

(21) Appl. No.: 12/421,377

(22) Filed: Apr. 9, 2009

(65) Prior Publication Data

US 2010/0188557 A1 Jul. 29, 2010

Related U.S. Application Data

(63) Continuation-in-part of application No. 12/321,996, filed on Jan. 28, 2009.

(51) Int. Cl.
*H04N 7/14* (2006.01)
*H04N 5/225* (2006.01)

(52) U.S. Cl.
USPC .............. 348/342; 348/14.01; 348/14.03; 348/14.08; 348/14.09

(58) Field of Classification Search
USPC .............. 348/342, 14.08, 14.01, 14.09
See application file for complete search history.

(56) References Cited

U.S. PATENT DOCUMENTS

| 5,025,314 | A | * | 6/1991 | Tang et al. | 348/14.08 |
| 5,400,069 | A | * | 3/1995 | Braun et al. | 348/14.16 |
| 7,333,135 | B2 | * | 2/2008 | Foote et al. | 348/211.12 |
| 7,428,000 | B2 | * | 9/2008 | Cutler et al. | 348/14.11 |
| 7,496,229 | B2 | * | 2/2009 | Zhang et al. | 382/176 |
| 2002/0030637 | A1 | * | 3/2002 | Mann | 345/8 |
| 2002/0180726 | A1 | | 12/2002 | Shi et al. | |
| 2008/0094588 | A1 | * | 4/2008 | Cole et al. | 353/122 |

OTHER PUBLICATIONS

Jorke et al, INFITEC—A New Stereoscopic Visualisation Tool by Wavelength Multiplex Imaging, www.infitec.net/INFITEC_english.pdf, 7 pages, Germany.
Liao et al, Robust and Accurate Visual Echo Cancelation in a Full-Duplex Projector-Camera System, IEEE Transactions on Pattern Analysis and Machine Intelligence, vol. X, No. X, YY 2006, Sep. 9, 2006, 17 pages.

* cited by examiner

*Primary Examiner* — James Hannett
*Assistant Examiner* — Quang Le
(74) *Attorney, Agent, or Firm* — Jack H. McKinney

(57) ABSTRACT

An image rendition and capture method includes rendering a first image on a surface using a first set of wavelength ranges of light. While the first image is being rendered, a second image is captured using a second set of wavelength ranges of light but not the first set. The second image is of the surface on which the first image is being rendered.

18 Claims, 9 Drawing Sheets

IMAGE RENDITION AND CAPTURE

This application is a continuation in part of application Ser. No. 12/321,996 filed Jan. 28, 2009 and entitled "Systems For Capturing Images Through A Display" which is hereby incorporated by reference in its entirety.

BACKGROUND

Productive collaborations often occur over a whiteboard with the participants actively presenting and discussing ideas. Video collaboration is utilized when one or more participants are located remotely. Effective video collaboration relies on the ability of the remote and local collaborators to utilize a "shared" whiteboard as well see as each other's gestures. The shared whiteboard is a combination of a local whiteboard and a remote whiteboard. An image of the remote whiteboard is captured and then rendered on the local whiteboard, while an image of the local whiteboard is captured and then rendered on the remote whiteboard. Thus the local whiteboard includes drawings formed by a local collaborator and a rendered image of drawings formed by a remote collaborator on the remote whiteboard. Likewise, the remote whiteboard includes drawings formed by a remote collaborator and a rendered image of drawings formed by the local collaborator on the local whiteboard. Absent correction, repeated capturing and rendering creates undesired visual echoes of drawings formed on the local and remote whiteboards.

DRAWINGS

DESCRIPTION

Various embodiments described below function to eliminate or at least substantially reduce visual echoes when collaborating via local and remote surfaces such as whiteboards. Instead of requiring computational effort to remove or cancel the visual echoes from the video streams, embodiments described below prevent the visual echoes from occurring in the first instance. In particular, an image of a remote surface is rendered on a local surface using a first set of wavelength ranges of light. An image of the local surface is captured using a second set of wavelength ranges of light but not the first set. In this manner, the captured image of the local surface includes drawing formed on the surface by a local collaborator with the image of the remote surface being filtered out. Thus, rendering the image of the local surface on the remote surface does not generate visual echoes of the drawings already formed on the remote surface.

Figure 1:
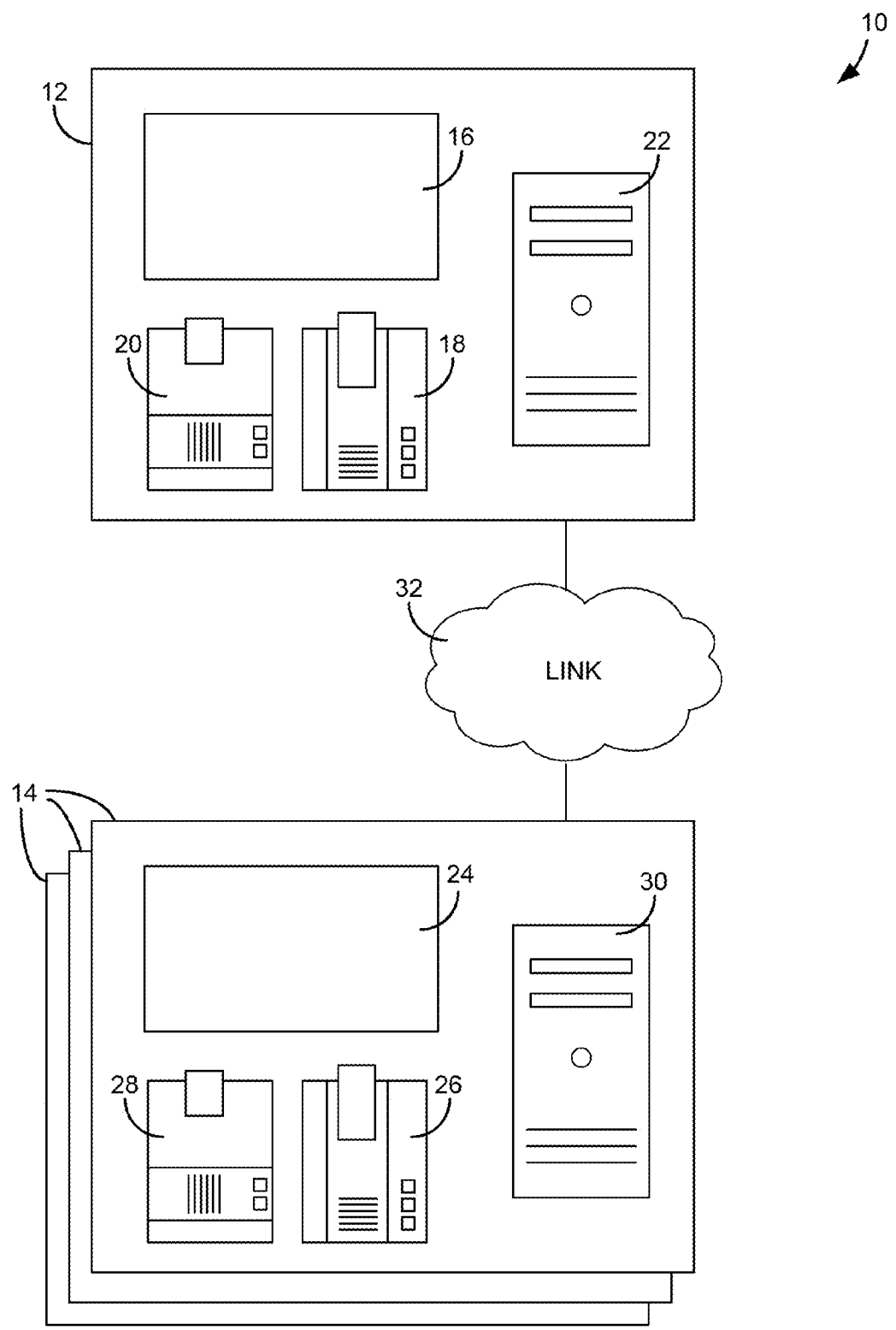
FIG. 1 is a schematic diagram depicting an exemplary environment in which various embodiments may be implemented.

Environment: FIG. 1 depicts an exemplary environment 10 in which various embodiments may be implemented. Environment 10 is shown to include local site 12 and one or more remote sites 14. Each site 12 and 14 represents a location where collaborators can gather. The modifiers "local" and "remote" are used only to distinguish between sites 12 and 14 with respect to a given individual. The terminology presumes one is positioned at or within local site 12 and is, thus, remote from site 14. From another perspective, one might be positioned at or within given site 14. In such a case, that particular site 14 could be considered local and site 12 would be remote.

Local site 12 is shown to include local surface 16, image renderer 18, camera 20, and video engine 22. Local surface 16 represents generally any surface such as a whiteboard or flip chart on which drawings may be formed and an image rendered. As used herein a formed drawing is a physical marking such as a line, curve, or other shape formed by ink from a dry erase pen or another material placed on local surface 16. A rendered image is a projection of a previously captured image. Image renderer 18 represents generally any component or combination of components configured to render an image on local surface 16. Camera 20 represents generally any component or combination of components configured to capture an image of local surface 16 while an image is being rendered on local surface 16. Video engine 22 represents generally any combination of hardware and programming configured to receive a video stream of images to be rendered on local surface 16 and communicating that video stream to image renderer 18. Video engine 22 is also responsible for communicating a video stream of images captured by camera 20.

Remote site 14 is shown to include remote surface 24, image renderer 26, camera 28, and video engine 30. Remote surface 24 represents generally any surface such as a whiteboard or flip chart on which drawings may be formed and an image rendered. Image renderer 26 represents generally any component or combination of components configured to render an image on remote surface 24. Camera 28 represents generally any component or combination of components configured to capture an image of remote surface 24 while an image is being rendered remote surface 24. Video engine 30 represents generally any combination of hardware and programming configured to receive a video stream of images to be rendered on remote surface 24 and communicating that video stream to image renderer 26. Video engine 30 is also responsible for communicating a video stream of images captured by camera 28.

While shown as separate components image renderer 18 and camera may be integrated into a single unit. Further, that that integrated unit may also include video engine 22. The same can be said for components 26, 28, and 30. Link 32 interconnects local site 12 and remote sites 14. In the example of FIG. 1, link 32 interconnects video engines 22 and 30. Link 32 represents generally one or more of a cable, wireless, fiber optic, or remote connection via a telecommunication link, an infrared link, a radio frequency link, or any other connector or system that provides electronic communication between video engines 22 and 30. In particular, link 32 provides a channel for communicating a video stream of images captured by camera 28 to imager renderer 18 and a channel for communicating a video stream of images captured by camera 20 to image renderer 26. While the foregoing presumes that the video streams communicated between sites 12 and 14 are made of sequences of images captured by cameras 20 and 28. Such need not be the case. To reduce network bandwidth, each video stream could include brush strokes, text, or other types of data extracted from the captured images by video engines 22 and 30.

Figure 2:
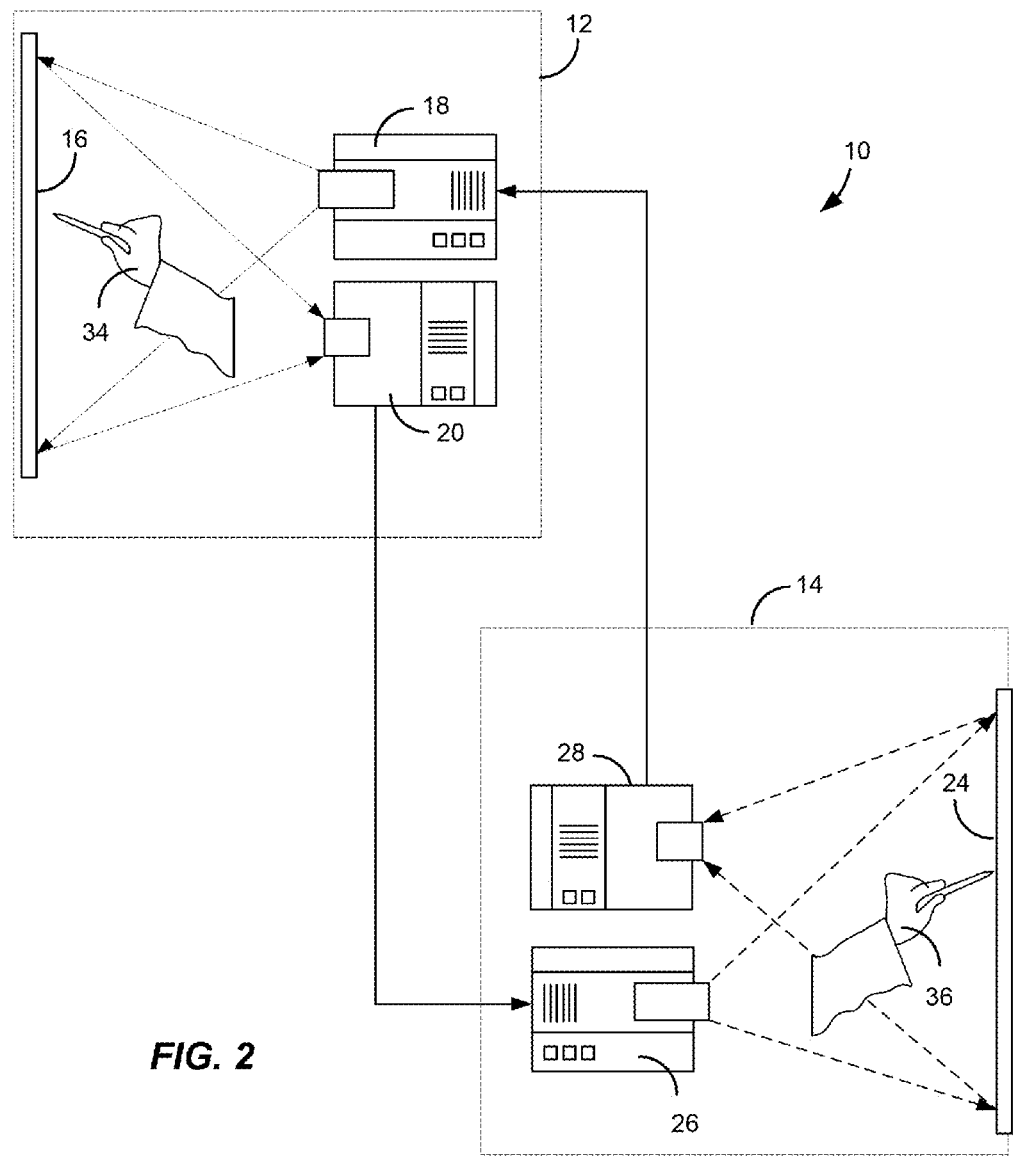
FIG. 2 is an exemplary schematic diagram depicting physical components of a video collaboration system.

Visual Echoes: FIG. 2 is a schematic diagram of a video collaboration system in environment 10. A local collaborator 34 forms drawings on local surface 16 while remote collaborator 36 forms drawings on remote surface 24. Images of remote surface 24 captured by camera 28 are communicated in a video stream to image renderer 18. Image renderer 18 renders the images of that video stream on local surface 16. At the same time, images of local surface 16 captured by camera 20 care communicated in a video stream to image renderer 26. Image renderer 26 renders images of that video stream on remote surface 24.

Figure 3:
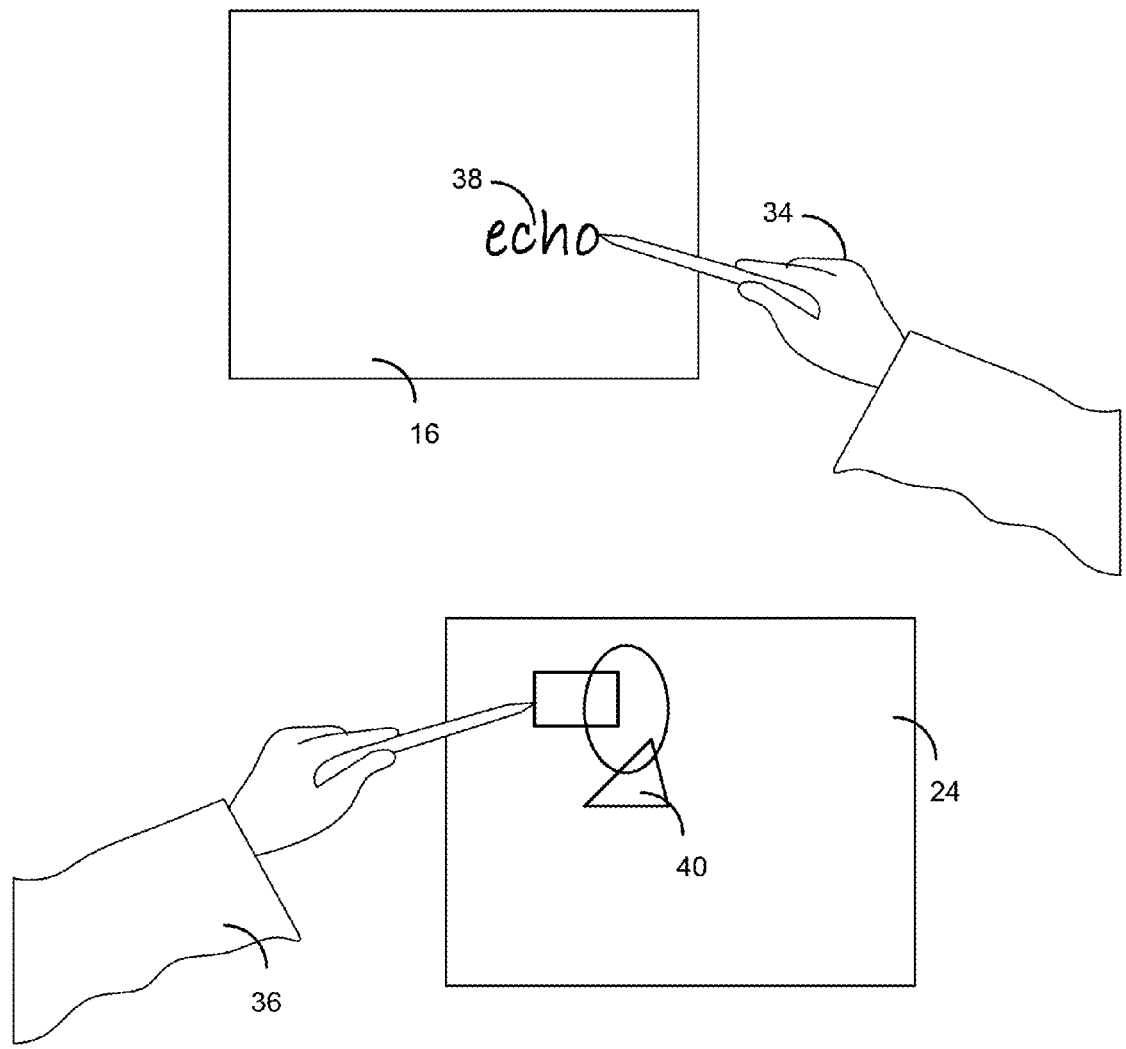
FIGS. 3-5 are exemplary schematic views of a local collaborator forming a drawing on a local surface and a remote collaborator forming a drawing on a remote surface and the resulting visual echoes.
Figure 4:
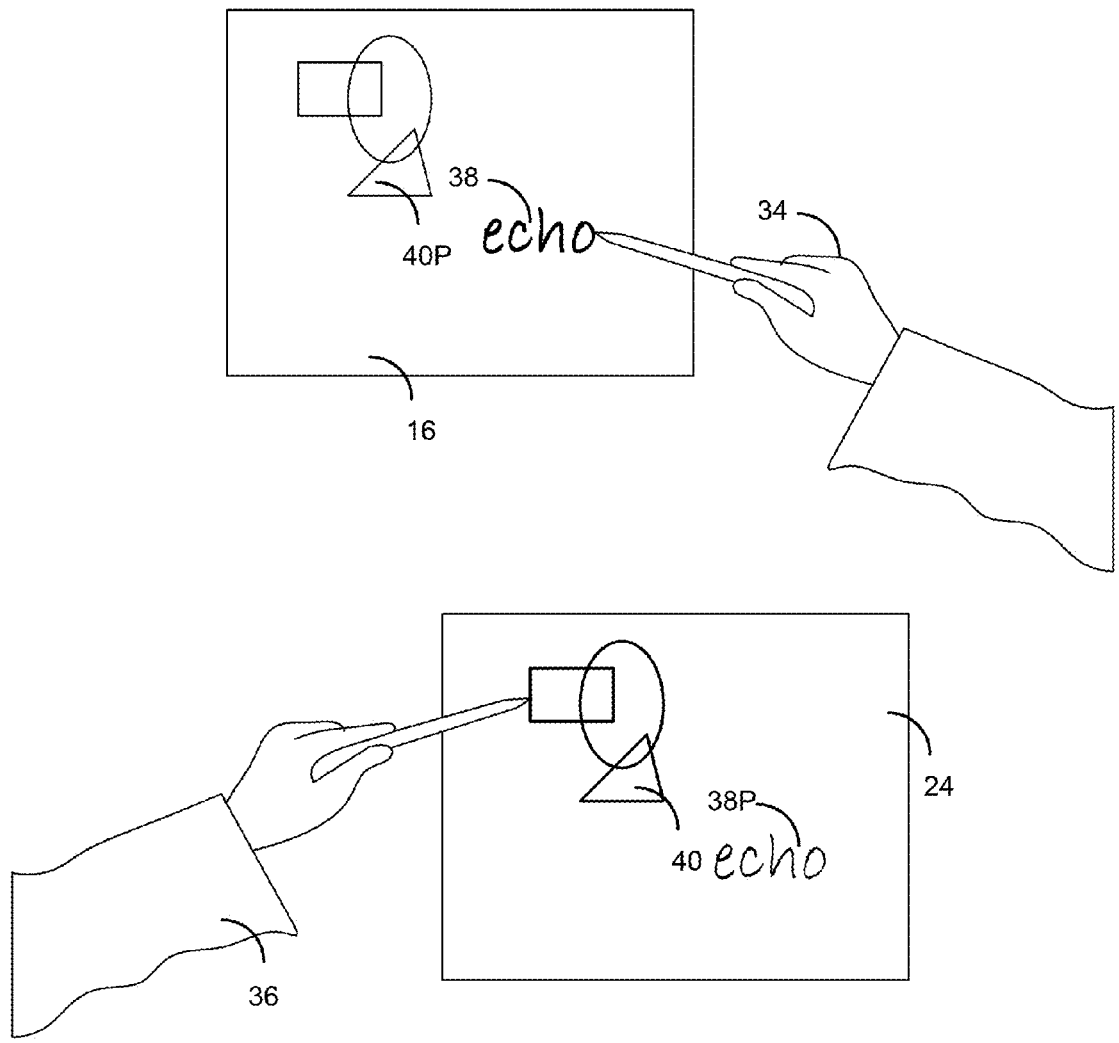
Figure 5:
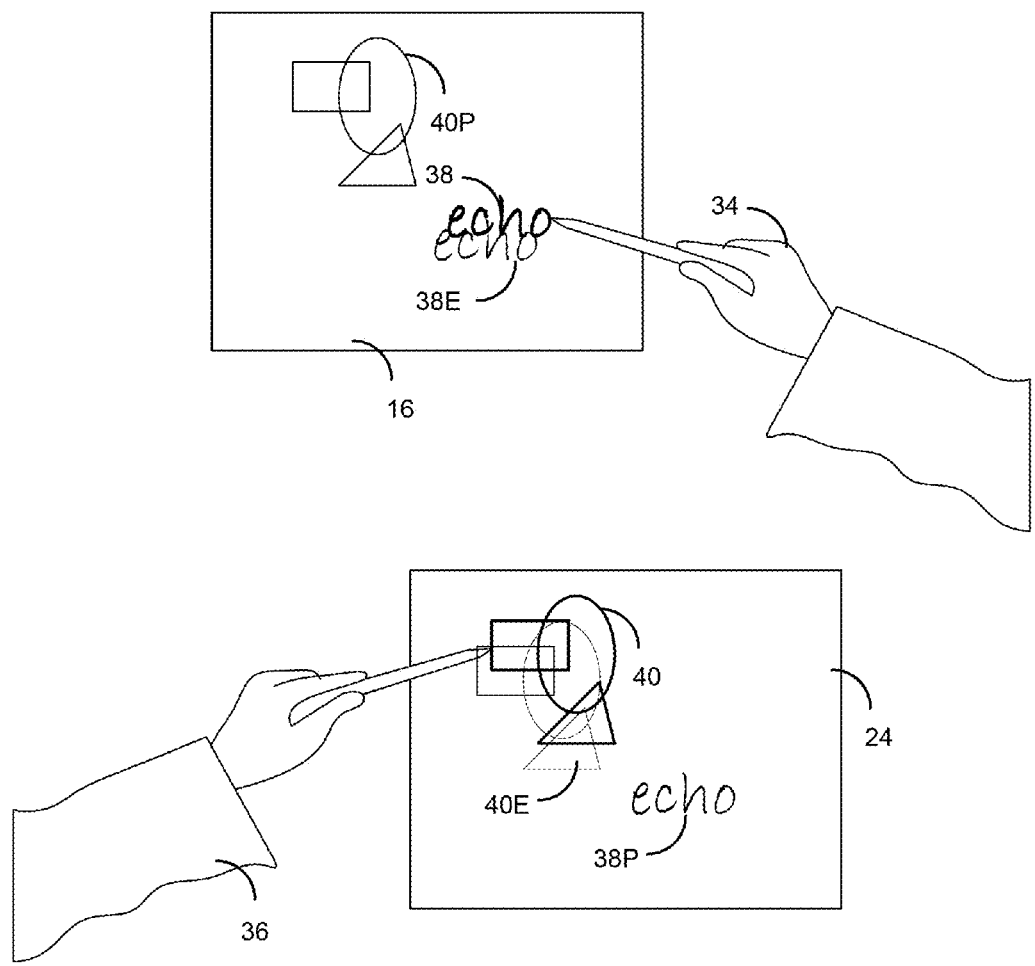

Moving to FIG. 3, local collaborator 34 has formed drawing 38 on local surface 16 while remote collaborator 36 has formed drawing 40 on remote surface 24. Camera 20 captures an image that includes drawing 38 while camera 28 captures an image that includes drawing 40. As seen in FIG. 4, image renderer 18 then renders image 40P of drawing 40 on local screen 16 while image renderer 26 renders image 38P of drawing 38 on remote screen 24. Camera 20 captures an image that includes drawing 38 and rendered image 40P while camera 28 captures an image that includes drawing 40 and rendered image 38P. Moving on to FIG. 5, image renderer 18 then renders image 38E an echo of drawing 38 in local screen 16 while image renderer 26 renders image 40E, an echo of drawing 40, on remote screen 24. The process repeats and multiple echoes of drawings 38 and 30 appear on surfaces 16 and 24. Eventually, the local and remote surfaces 16 and 24 are cluttered with visual echoes.

Figure 6:
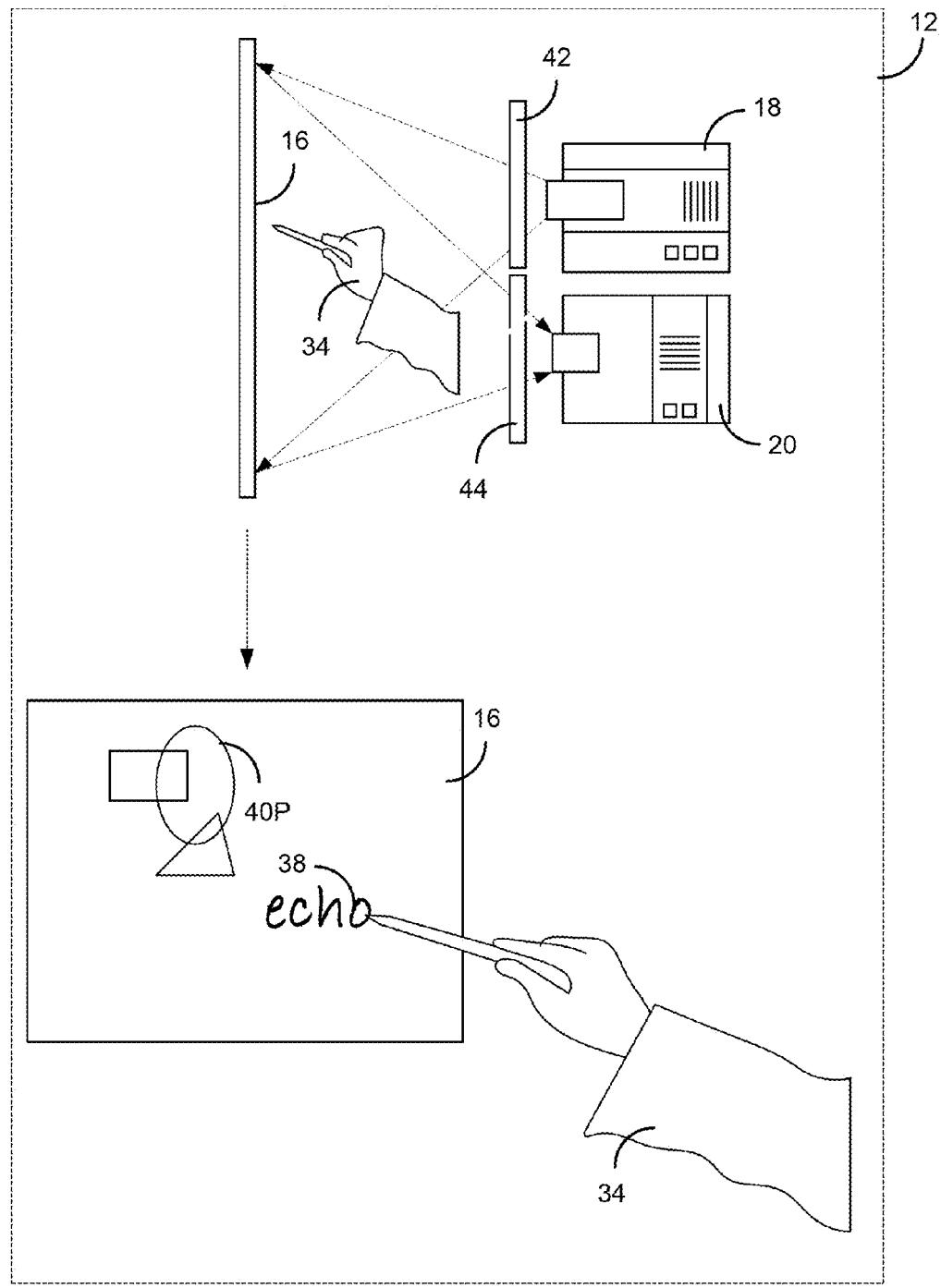
FIG. 6 is an exemplary schematic diagram depicting physical components of a local video conferencing system according to an embodiment.
Figure 7:
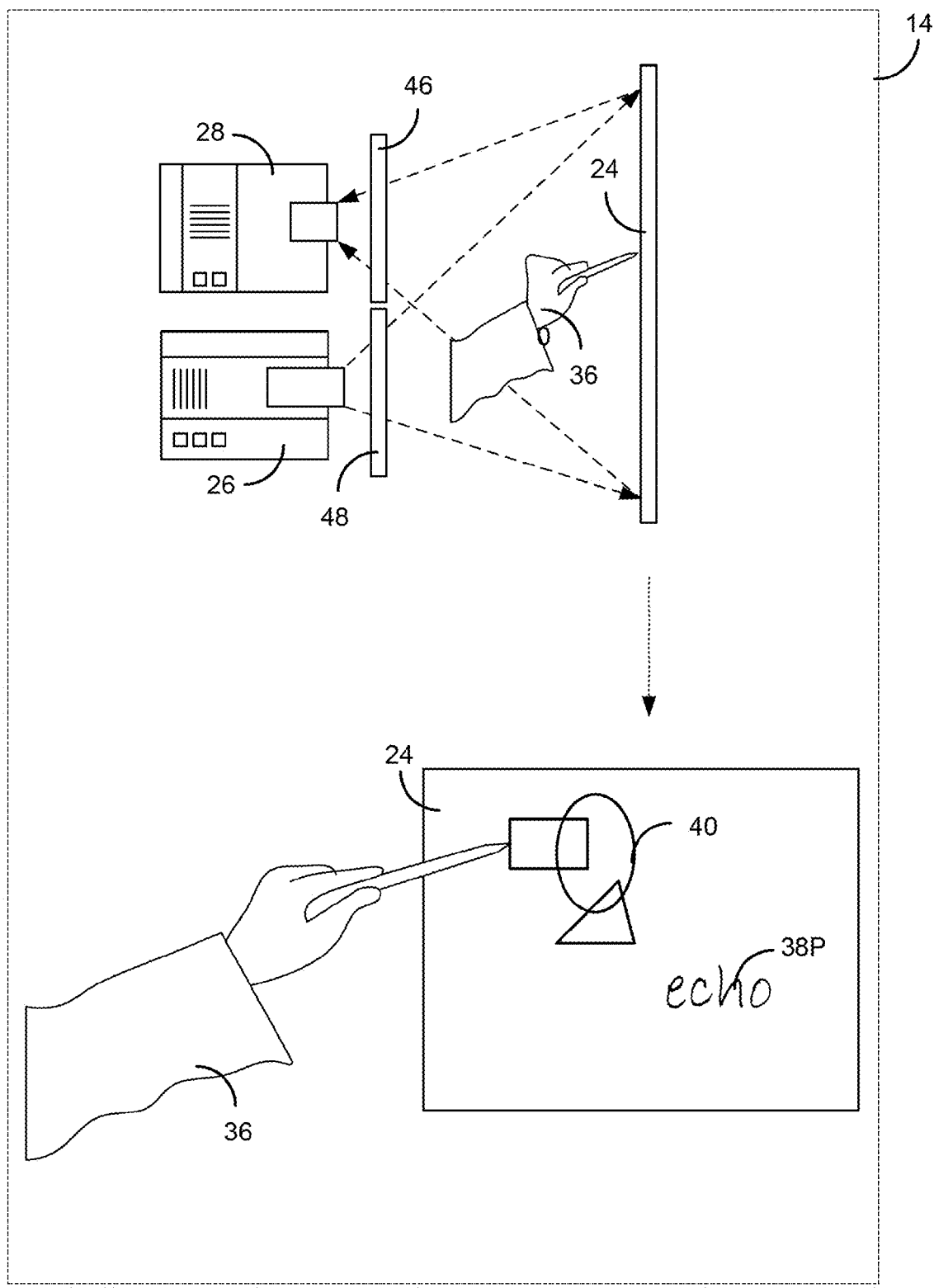
FIG. 7 is an exemplary schematic diagram depicting physical components of a remote video conferencing system according to an embodiment.

Echo Prevention: FIGS. 6 and 7 are schematic representations of video collaborations systems configured to prevent visual echoes. Starting with FIG. 6, filters 42 and 44 are added to local site 12. Filters 42 and 44 are positioned so that light output from image renderer 18 passes through filter 42 before striking local surface 16. Light captured by camera 20 first passes through filter 44. Filters 42 and 44 are configured to prevent light projected by image renderer 18 and reflected from local surface 16 from interfering with light captured by camera 20. In particular, filter 42 can be configured to pass or transmit a first set of wavelength ranges that when combined create the visual sensation of a much broader range of colors in projecting images on the local surface 16. Filter 44 can be configured to pass or transmit a second set of wavelength ranges that are different from the first set of wavelength ranges. The second set of wavelength ranges can also be used to create the visual sensation of a much broader range of colors.

Restated, filter 44 is configured and positioned to block the wavelength ranges that are used to render images on the local surface 16 from being captured by camera 20. Even though the wavelength ranges used to render images viewed by local collaborator 34 are different from the wavelength ranges of light used to capture images by camera 20, image renderer 18 can still use the colors transmitted through filter 42 to project full color images and light transmitted through filter 44 and captured by camera 20 can still be used to record and communicate full color images. It is the component wavelengths of the light used to project and capture the full color images that are prevented from interfering.

Continuing with the previous examples, a first set of wavelength ranges of light is used to render drawing 40P on local surface 16 while a second set of wavelength ranges of light is used to capture drawing 38 formed by local collaborator 34. In other words, filter 44 blocks camera 20 from "seeing" rendered image 40P. Thus the video stream communicated to remote site 14 (see FIG. 7) does not include rendered drawing 40P preventing the formation of a visual echo on remote surface 24 (see FIG. 7).

Moving to FIG. 7, filters 46 and 48 are added to remote site 14. Filters 46 and 48 are positioned so that light output from image renderer 26 passes through filter 48 before striking remote surface 24. Light captured by camera 28 first passes through filter 46. Filters 46 and 48 are configured to prevent light projected by image renderer 26 and reflected from remote surface 24 from interfering with light captured by camera 28. Filter 48 need not, but may, be configured to pass or transmit the same set of wavelength ranges as filter 44 (FIG. 6), while filter 46 need not, but may, be configured to pass or transmit the same set of wavelength ranges as filter 42 (FIG. 6).

In general, each pixel of a filtered and captured image may be defined by the numerical values for each of its color components. Referring to camera 28, those numerical values are affected by filter 46. With respect to camera 20, those values are affected by filter 44. An image is rendered using the numerical values for each of the image's pixels. The values for each pixel drive a given image renderer 18 or 26 to project or otherwise render colored light that is typically of a different spectra than that of the captured image. Thus, even if filter 42 is configured to transmit a set of wavelength ranges that differs from filter 46, filter 42 will not prevent image renderer 18 from rendering a full color image on local surface 16. Likewise, even if filter 48 is configured to transmit a set of wavelength ranges that differs from filter 44, filter 48 will not prevent image renderer 26 from rendering a full color image on remote surface 24.

Continuing with the previous examples, a first set of wavelength ranges of light is used to render drawing 38P on remote surface 24 while a second set of wavelength ranges of light is used to capture drawing 40 formed by remote collaborator 36. In other words, filter 46 blocks camera 28 from "seeing" rendered image 38P. Thus the video stream communicated to local site 12 (FIG. 6) does not include rendered drawing 38P preventing the formation of a visual echo on local surface 16 (FIG. 6).

Figure 8:
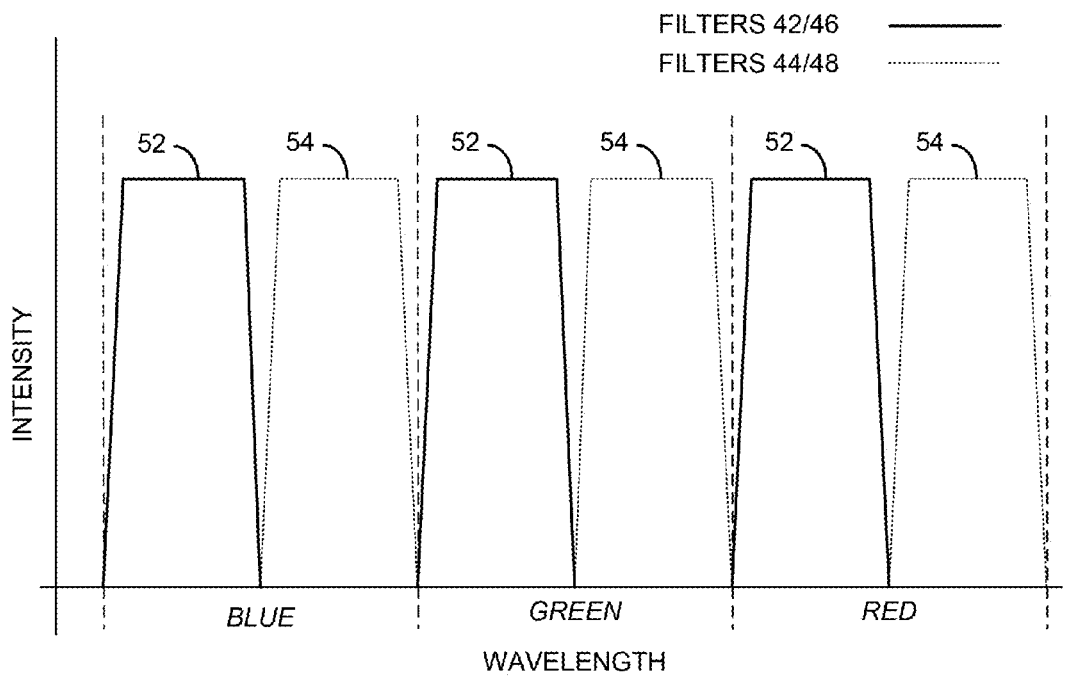
FIG. 8 depicts a plot graphing exemplary wavelength ranges over which two filters transmit light according to an embodiment.

FIG. 8 shows exemplary plots 52 and 54 of wavelength ranges over which filters 42 and 44 may be configured to pass or transmit light. As shown, the red, green and blue portions of the spectrum are each split into two halves with filter 42 passing relatively shorter wavelength ranges of the red, green, and blue portions. Filter 44 is shown to transmit or pass the relatively longer wavelength ranges of the red, green, and blue portions of visible spectrum. As shown, filters 42 and 44 transmit different wavelength ranges of the red, green, and blue portions of the visible spectrum. In particular, filter 42 passes a first set of ranges while at least substantially blocking the second set of ranges. Filter 44 passes the second set of ranges by at least substantially blocking the first set of ranges. Each set of ranges of red, green, and blue wavelengths can be treated as primary colors that can be combined to produce a full range of colors in projecting images on local and remote surfaces 16 and 24. The foregoing also holds true for filters 46 and 48, while the particular wavelength ranges may differ. Thus, filters 42 and 44 effectively block the light used to render color images on local surface 16 from being captured and echoed onto remote surface 24. Likewise, filters 46 and 48 effectively block the light used to render color images on remote surface 24 from being captured and echoed onto local surface 16.

Instead of utilizing filter 42, imager renderer 18 may be configured to render images on local surface 16 using only the set of wavelength ranges that are blocked by filter 44. Likewise, image renderer 26 may not rely in filter 48 but instead be configured to render images on remote surface 24 using only the set of wavelength ranges that are blocked by filter 46. For example, image renderer 18 or 26 may utilize three micro-displays and color splitting optics that send red, green and blue light from a projector bulb to surface 16 or 24. The micro-displays may be utilize liquid crystal display ("LCD") technology, liquid crystal on silicon ("LCoS") technology, or digital-micro-mirror device ("DMD") technology. In such a system, the functionality of filter 42 can be incorporated into the color splitting optics within the imager renderer 18.

Figure 9:
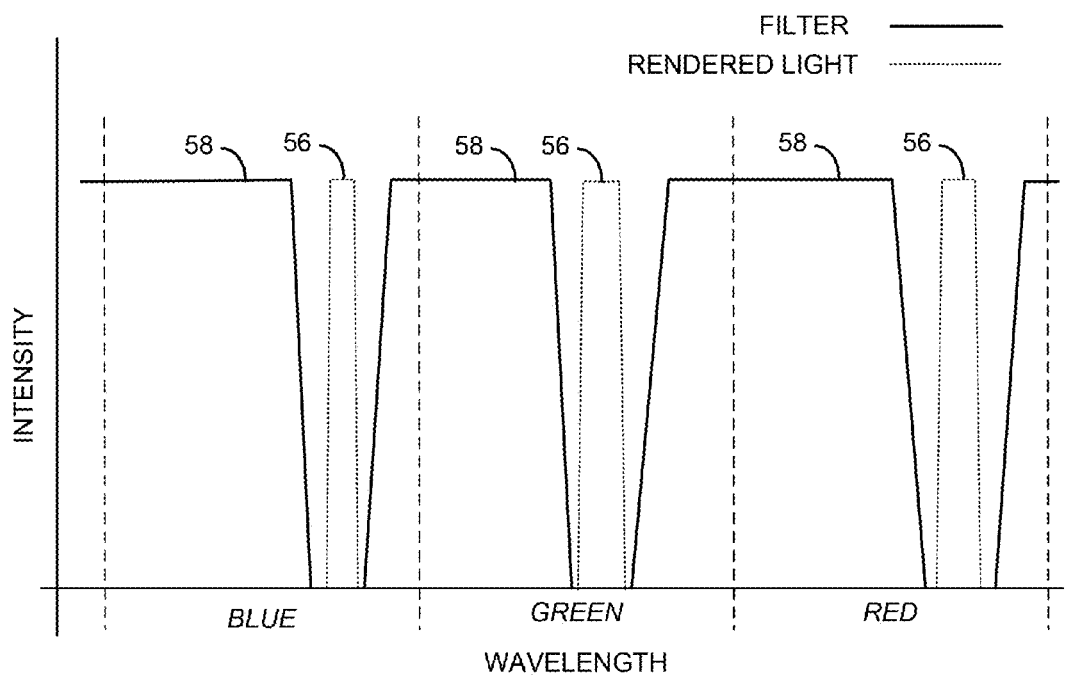
FIG. 9 depicts a plot graphing exemplary wavelength ranges over which a projector renders images and a camera captures images according to an embodiment

In other embodiments, the lamp producing white light can be replaced by separate light sources such as lasers, each light source generating a narrow wavelength range of light that when combined with appropriate intensities produce a full range of colors. Each color produced by a different laser passes through a corresponding LCD or is reflected off of a corresponding LCoS and the colors are recombined within the image renderer 18 or 26 to render full color images on surfaces 16 or 24. Note that the use of a relatively narrow set of wavelength ranges by image renderers 18 and 26 allows the complementary set of wavelength ranges passed by filters 44 and 48 to be relatively broader, allowing more light into the captured images. FIG. 9 shows exemplary plots 56 and 58 of wavelength ranges. Plot 56 corresponds to the relatively narrow set of wavelength ranges utilized by an image renderer incorporating the laser light sources discussed above. Plot 58 corresponds to the relatively broader complementary set of wavelength ranges passed by corresponding filter 44 or 48.

In other embodiments the function of filters 44 and 48 could be incorporated into the optics of cameras 20 and 28. For example the color filter mosaic that forms part of a camera's image sensor could be selected to pass only selected sets of wavelength ranges.

Figure 10:
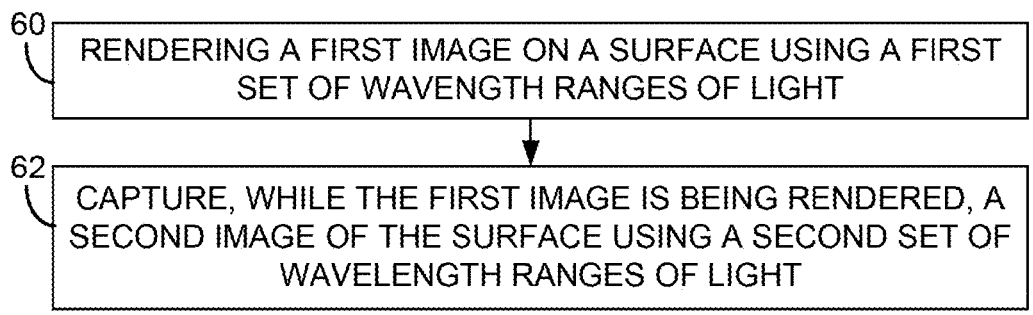
FIGS. 10-11 are exemplary flow diagrams depicting steps taken to implement various embodiments.
Figure 11:
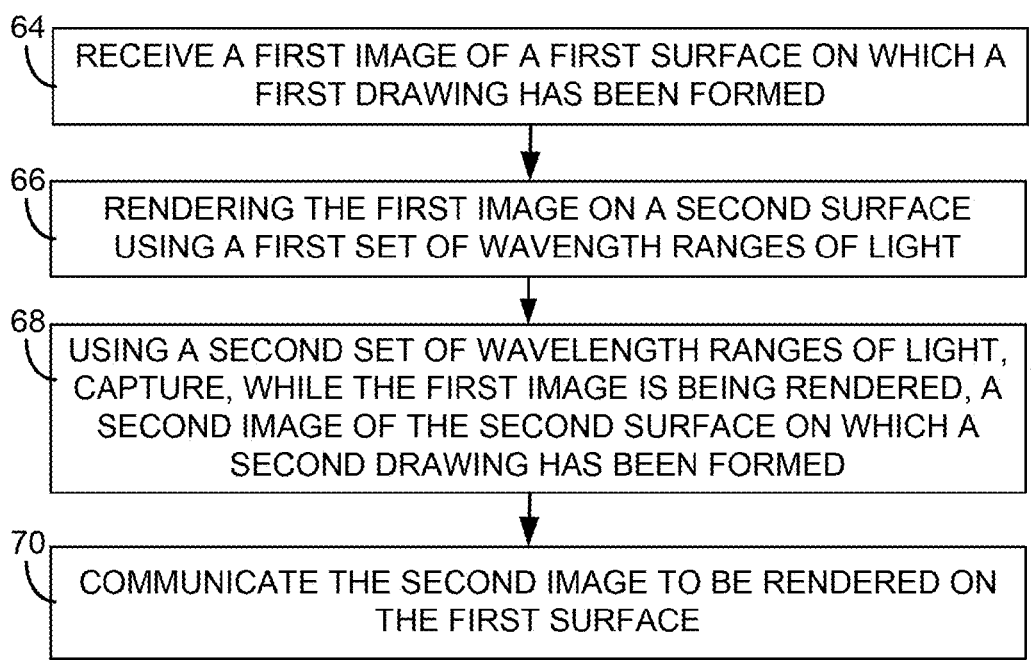

Operation: FIGS. 10 and 11 are exemplary flow diagrams illustrating steps taken to implement various embodiments. In discussing FIGS. 10 and 11, reference is made to the diagrams of FIGS. 6 and 7 to provide contextual examples. Implementation, however, is not limited to those examples. Starting with FIG. 10, a first image is rendered on a first surface using a first set of wavelength ranges of light (step 60). Step 60, for example, may be accomplished utilizing image renderer 18 or 26 depicted in FIGS. 6 and 7. In performing step 60, the image may be projected through filter 42 or filter 48. That filter 42 or 48 allows the first set of wavelength ranges to pass onto local surface 16 or remote surface 24 as the case may be. The filter 42 or 48 blocks a second set of wavelength ranges of light. Alternatively, image renderer 18 or 26 may simply be configured to render an image using only the first set of wavelength ranges of light.

Continuing with FIG. 10, while the first image is being rendered on the surface, a second image is captured (step 62). The second image is of the surface and is captured using the second set of wavelength ranges of light but not the first set. Referring back to FIGS. 6 and 7, camera 20 or 28 may implement step 80 by capturing light emanating from local surface 16 or remote surface 24. Before being captured that light may pass through filter 44 or 46 as the case may be to block the first set of wavelength ranges. Thus the image captured in step 62 will include any drawings formed on the surface by a collaborator but will not include the image rendered in step 60.

Referring now to FIG. 11, a first image is received (step 64). The first image is of a first surface on which a first drawing has been formed. The first image is rendered on a second surface using a first set of wavelength ranges of light (step 66). Steps 64 and 66, for example, may be accomplished, at least in part, utilizing image renderer 18 or 26 depicted in FIGS. 6 and 7. In performing step 66, the image may be projected through filter 42 or filter 48. That filter 42 or 48 allows the first set of wavelength ranges to pass onto local surface 16 or remote surface 24 as the case may be. The filter 42 or 48 blocks a second set of wavelength ranges of light. Alternatively, image renderer 18 or 26 may simply be configured to render an image using only the first set of wavelength ranges of light.

Continuing with FIG. 11, a second drawing has been formed on the second surface. While the first image is being rendered in step 66, a second image is captured (step 68). The second image is communicated to be rendered on the first surface (step 70). The second image is of the second surface and is captured using the second set of wavelength ranges of light but not the first set. Referring back to FIGS. 6 and 7, camera 20 or 28 may, at least in part, implement steps 68 and 70 by capturing light emanating from local surface 16 or remote surface 24. Before being captured that light may pass through filter 44 or 46 as the case may be to block the first set of wavelength ranges. Thus the image captured in step 68 will include the second drawing formed on the second surface but will not include the first image rendered on that surface in step 66.

Steps 64-70 can be repeated in a loop to render a first video stream on the second surface. That first video stream is indicative a first video collaborator's actions with respect to the first surface. Further, a second video stream of the second surface would be captured and communicated to be rendered on the first surface. That second video stream would be indicative of a second video collaborator's actions with respect to the second surface. The second video stream would not include images rendered on the second surface. Likewise, the first video stream would not include images rendered on the first surface.

Conclusion: The environment 10 shown in FIG. 1 is an exemplary environment in which embodiments of the present invention may be implemented. Implementation, however, is not so limited. Embodiments can be implemented in any environment in which video collaboration is desirable. The diagrams of FIGS. 2-9 show the architecture, functionality, and operation of various embodiments. Certain components are defined at least in part as a program or program instructions. Such components may represent, at least in part, a module, segment, or portion of code that comprises one or more executable instructions to implement the specified logical function(s). Such components may also represent a circuit or a number of interconnected circuits to implement the specified logical function(s).

Although the flow diagrams of FIGS. 10-11 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. An image rendition and capture method, comprising:
   a projector rendering a first image on a surface using a first set of wavelength ranges of light; and
   a camera capturing, while the first image is being rendered, a second image using a second set of wavelength ranges of light but not the first set, the second image being of the surface on which the first image is being rendered;
   wherein the first set of wavelength ranges represent a first portion of a first color of the color spectrum and wherein the second set of wavelength ranges represent a second portion of the first color of the color spectrum.

2. The method of claim 1, wherein capturing comprises capturing the second image using the second set of wavelength ranges while blocking the first set of wavelength ranges of light.

3. The method of claim 1, wherein the first image is of a drawing that is not captured in the second image.

4. The method of claim 1, wherein:
   rendering comprises projecting the first image onto the surface filtering the second set of wavelength ranges of light from the projection; and
   capturing comprises filtering the first set of wavelength ranges from the light emanating from the surface and capturing the filtered light.

5. The method of claim 1, further continually repeating the rendering and the capturing to render a first video stream on the surface and to capture a second video stream of the surface.

6. The method of claim 1, wherein the first set of wavelength ranges further represent a first portion of a second color of the color spectrum and wherein the second set of wavelength ranges further represent a second portion of the second color of the color spectrum.

7. An image rendition and capture method, comprising:
   a camera receiving a first image of a first surface on which a first collaborator has formed a first drawing;
   a projector rendering the first image on a second surface using a first set of wavelength ranges of light;
   capturing, while the first image is being rendered a second image using a second set of wavelength ranges of light but not the first set, the second image being of the second surface on which the first image is being rendered and on which a second collaborator has formed a second drawing;
   wherein the first set of wavelength ranges represent a first portion of a first color of the color spectrum and wherein the second set of wavelength ranges represent a second portion of the first color of the color spectrum; and
   communicating the second image to be rendered on the first surface.

8. The method of claim 7, wherein capturing comprises capturing the second image using the second set of wavelength ranges while blocking the first set of wavelength ranges.

9. The method of claim 7, wherein capturing comprises capturing the second image such that the captured second image includes the second drawing but not the first drawing.

10. The method of claim 7, wherein;
    rendering comprises projecting the first image onto the surface filtering the second set of wavelength ranges of light from the projection; and
    capturing comprises filtering the first set of wavelength ranges from the light emanating from the surface and capturing the filtered light.

11. The method of claim 7, comprising:
    repeating the rendering to render a first video stream on the second surface, first video stream being indicative of the first collaborator' actions with respect to the first surface; and
    repeating the capturing to capture a second video stream of the second surface, the second video stream being indicative of the second collaborator's actions with respect to the second surface.

12. The method of claim 7, wherein the first set of wavelength ranges further represent a first portion of a second color of the color spectrum and wherein the second set of wavelength ranges further represent a second portion of the second color of the color spectrum.

13. An image rendition and capture system comprising a camera and a projector, wherein:
    The projector is configured to render a first image on a local surface using a first set of wavelength ranges of light; and
    the camera is configured to capture, while the first image is being rendered, a second image using a second set of wavelength ranges of light but not the first set, the second image being of the local surface on which the first image is being rendered;
    wherein the first set of wavelength ranges represent a first portion of a first color of the color spectrum and wherein the second set of wavelength ranges represent a second portion of the first color of the color spectrum.

14. The system of claim 13, wherein the camera includes a first filter for blocking the first set of wavelength ranges.

15. The system of claim 13, wherein:
    the first image includes a first drawing formed by a remote collaborator on a remote surface; an
    the camera is configured to capture the second image of the local surface on which a second drawing has been formed by a local collaborator such that the second image includes the second drawing but not the first drawing.

16. The system of claim 13, wherein:
    the projector is configured to project the first image onto the local surface filtering the second set of wavelength ranges of light from the projection; and
    the camera is configured to filter the first set of wavelength ranges from the light emanating from the surface and capture the filtered light.

17. The system of claim 13, further comprising a video engine configured to:
    receive a first video stream of a first surface on which a first collaborator is interacting with a remote surface, the first video stream including the first image, the first image including a first drawing formed by the remote collaborator on the remote surface; and
    communicate a second video stream to be rendered on the remote surface, the second video stream including the second image, the second image including a second drawing formed by the local collaborator on the local surface but not the first drawing;
    wherein the projector is configured to render the first video stream on the local surface using the first set of wavelength ranges of light but not the second set, and the camera is configured to capture a plurality of images used to form the second video stream using the second set of wavelength ranges of light but not the first set.

18. The system of claim 13, wherein the first set of wavelength ranges further represent a first portion of a second color of the color spectrum and wherein the second set of wavelength ranges further represent a second portion of the second color of the color spectrum.

* * * * *

UNITED STATES PATENT AND TRADEMARK OFFICE
CERTIFICATE OF CORRECTION

PATENT NO.         : 8,619,178 B2                                                  Page 1 of 1
APPLICATION NO.    : 12/421377
DATED              : December 31, 2013
INVENTOR(S)        : Kar Han Tan et al.

It is certified that error appears in the above-identified patent and that said Letters Patent is hereby corrected as shown below:

In the Claims

In column 7, line 39, in Claim 7, delete "rendered" and insert -- rendered, --, therefor.

In column 8, line 4, in Claim 11, delete "collaborator'" and insert -- collaborator's --, therefor.

In column 8, line 15, in Claim 13, delete "The" and insert -- the --, therefor.

In column 8, line 30, in Claim 15, delete "an" and insert -- and --, therefor.

Signed and Sealed this
Twenty-ninth Day of July, 2014

Michelle K. Lee
*Deputy Director of the United States Patent and Trademark Office*